United States Patent [19]
Hoshito et al.

[11] 4,201,994
[45] May 6, 1980

[54] INFORMATION FORMATION APPARATUS

[75] Inventors: Kazuo Hoshito, Kawasaki; Hideaki Sato, Yokohama; Takashi Kitamura, Yokohama; Koichi Masegi, Yokohama, all of Japan

[73] Assignee: Canon Kabushiki Kaisha, Tokyo, Japan

[21] Appl. No.: 833,342

[22] Filed: Sep. 14, 1977

[30] Foreign Application Priority Data

Sep. 17, 1976 [JP] Japan .................................. 51-111563

[51] Int. Cl.$^2$ ............................................. G01D 15/14
[52] U.S. Cl. .................................... 346/108; 346/160; 358/285
[58] Field of Search ...................... 346/108, 76 L, 160; 354/5, 7, 9; 358/300, 302, 293, 292, 285

[56] References Cited

U.S. PATENT DOCUMENTS

| | | | |
|---|---|---|---|
| 3,638,185 | 1/1972 | Dell | 346/108 X |
| 3,809,806 | 5/1974 | Walker | 346/108 X |
| 4,059,833 | 11/1977 | Kitamura | 346/108 |
| 4,067,021 | 1/1978 | Baylis | 346/108 X |

*Primary Examiner*—Joseph W. Hartary
*Attorney, Agent, or Firm*—Fitzpatrick, Cella, Harper & Scinto

[57] ABSTRACT

An information formation apparatus for forming information on a beam-irradiated member by the use of a beam comprises beam generator-modulator for forming a beam modulated by information signals applied thereto, a deflector for deflecting the beam in accordance with a scan pass, an information formation member on which the beam deflected by the deflector is projected, the member having an information formation region on which information is formed by the beam, beam detector for detecting the intensity of the beam scanning the other portion of the information formation member than the information formation region and producing a detection signal corresponding to the beam intensity detected, and beam controller for controlling the intensity of the beam as it scans the information formation region of the information formation member.

18 Claims, 10 Drawing Figures

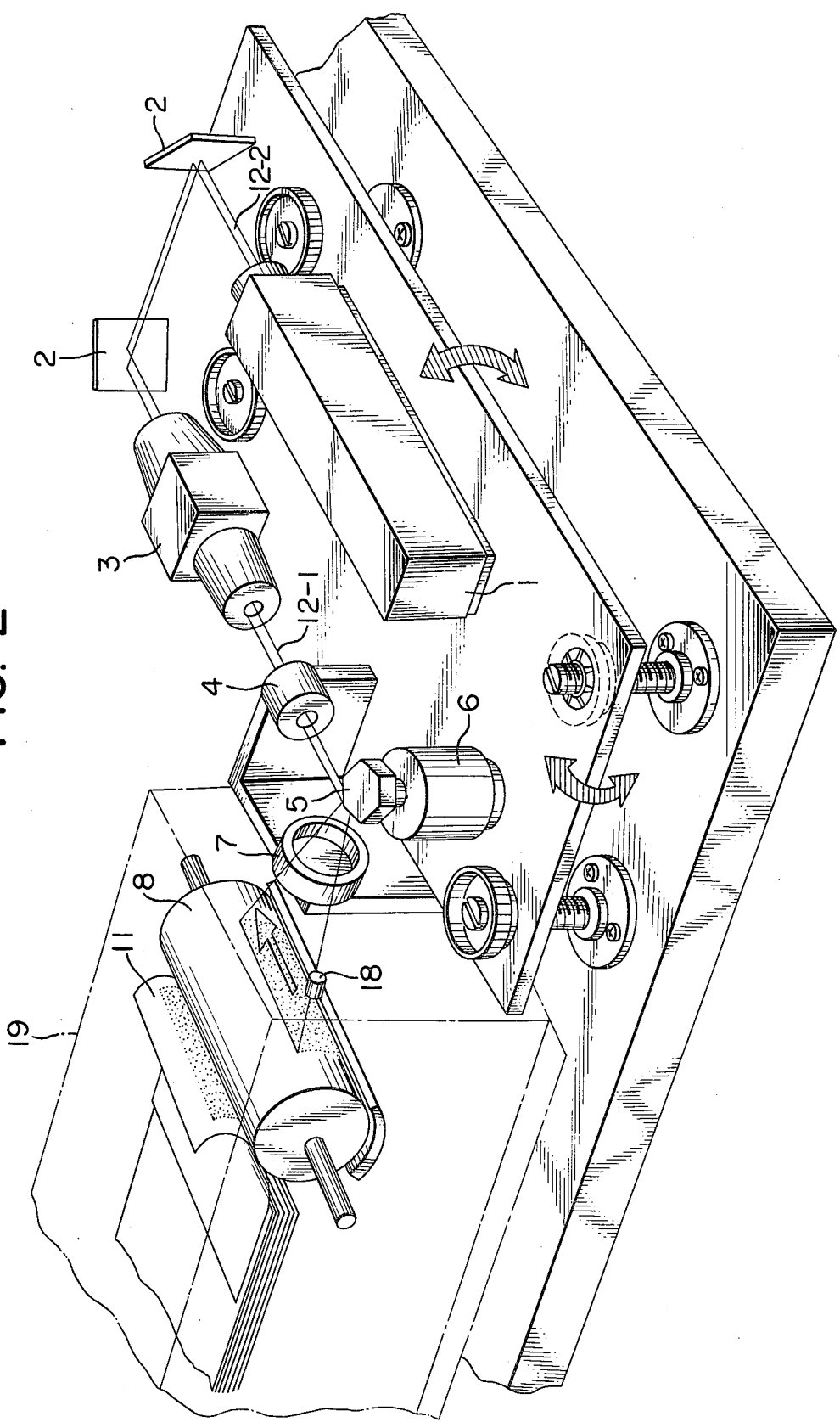

INFORMATION FORMATION APPARATUS

BACKGROUND OF THE INVENTION

1. Field of the Invention

This invention relates to an information formation apparatus in which information beam modulated by information signal scans an information formation member to thereby form on the information formation member the information corresponding to the information signals. More particularly, the invention relates to an information formation apparatus in which the intensity of the information beam is controlled to make uniform the formation of information on the information formation member.

2. Description of the Prior Art

In a recording apparatus such as the one disclosed in our U.S. Pat. No. 4,059,833, namely, the beam recording apparatus wherein a recording beam modulated by recording signals scans a recording medium to thereby effect on the recording medium the record corresponding to the recording signals, control of the beam itself projected on the recording medium has not been carried out in particular.

In such a beam recording apparatus, therefore, the intensity of the beam has suffered from variations caused by variations in ambient temperature or the like, which has also led to variations in the density of the record formed on the recording medium by the projection of the beam thereon.

Where a rotatable polygonal mirror or the like is used to cause the recording beam to scan over the recording medium, there has been encountered a disadvantage that any difference in reflection factor between the mirrored surfaces of the rotatable polygonal mirror results in some difference in recording density for each scanning line.

SUMMARY OF THE INVENTION

It is therefore an object of the present invention to present an information formation apparatus which is capable of performing stable formation (recording) of information.

It is another object of the present invention to present an information formation apparatus which comprises a very simple circuit and does not adversely affect the formation of information on the information formation member effected by the beam.

It is still another object of the present invention to present an information formation apparatus in which the intensity of the beam projected on the information formation member remains constant irrespective of any variation in ambient temperature or the like.

It is yet still another object of the present invention to present an information formation apparatus in which the intensity of the beam projected on the information formation member remains constant irrespective of any variation in the quantity of light reflected by beam reflector means.

Other objects and effects of the present invention will become more fully apparent from the following detailed description of the invention taken in conjunction with the accompanying drawings.

BRIEF DESCRIPTION OF THE DRAWINGS

FIGS. 1 and 2 are perspective views of a recording apparatus to which the present invention is applied.

DESCRIPTION OF THE PREFERRED EMBODIMENT

Although recording apparatus of the type in which a recording beam is projected upon a photosensitive drum to record information thereon is herein shown by way of example as the information formation apparatus, it is of course possible to adopt the same concept to provide a beam display apparatus in which a modulated beam is projected upon a screen to display information thereon.

Figure 1:
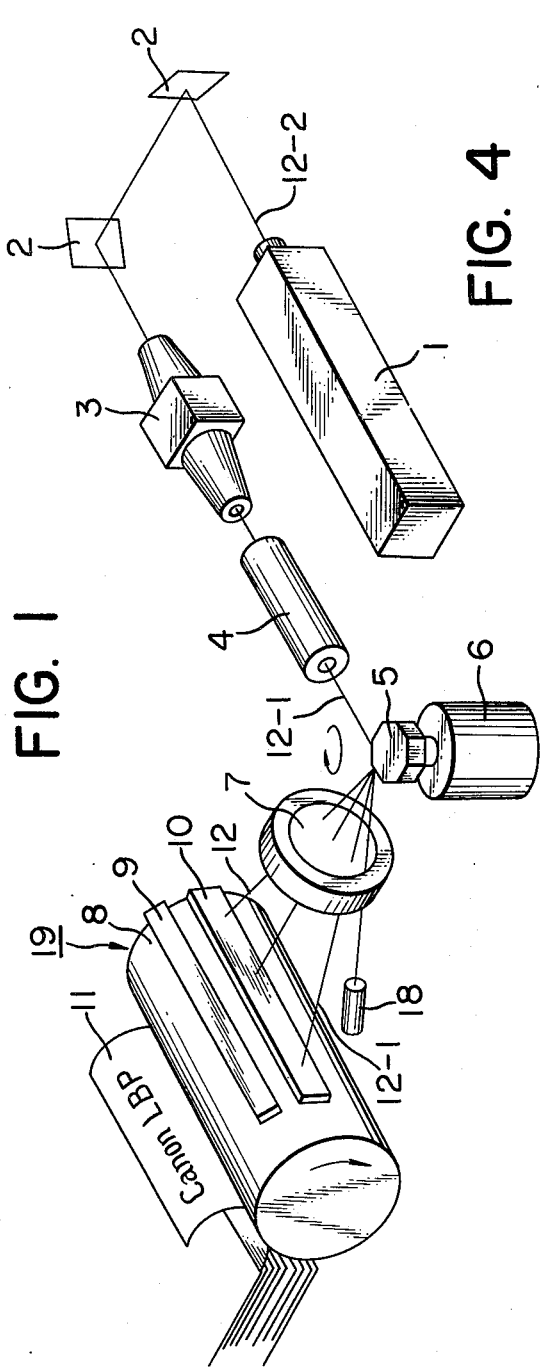

Referring to FIGS. 1 and 2 which are perspective views schematically showing a beam recording apparatus and an actual apparatus, respectively, a laser beam 12-2 oscillated from a laser oscillator 1 is directed via a mirror 2 to the input opening of a modulator 3. The mirror 2 is inserted to bend the light path to thereby reduce the space occupied by the apparatus, and may be omitted if not required.

The modulator 3 may be a conventional acousto-optical modulator utilizing the acousto-optical effect or a conventional electro-optical modulator utilizing the electro-optical effect.

In the modulator 3, the laser beam is intensity-modulated in accordance with the input signal thereto.

Where the laser oscillator is a semiconductor laser or even a gas laser of the type which permits current modulation or of the internal modulation type which incorporates a modulating element in the path of the oscillated beam, the modulator 3 may be eliminated and the laser beam may be directly directed to a beam expander 4.

The laser beam 12-1 from the modulator 3 has its beam diameter expanded by the beam expander 4 while remaining to be a parallel beam. The laser beam having its beam diameter so expanded is incident on a rotatable polygonal mirror 5 having a plurality of mirrored surfaces. The rotatable polygonal mirror 5 is mounted on a shaft supported by a high-precision bearing (such as pneumatic bearing), and is driven from a constant-speed motor 6 (such as hysteresis synchronous motor or DC servo motor). The laser beam 12 horizontally swept by the rotatably polygonal mirror 5 is passed through a focusing lens 7 having f-$\theta$ characteristic and focused as a spot on a photosensitive drum 8. In ordinary focusing lenses, the focus position r on the image plane for an angle of incidence $\theta$ of light rays is in the relation that $r = f \cdot \tan \theta$ (f is the focal length of the focusing lens), and in the case of the laser beam 12 reflected by a predetermined polygonal rotatable mirror 5 as in the present embodiment, its angle of incidence on the focusing lens 7 is variable with time in the fashion of a linear function. Accordingly, the velocity of movement of the spot formed on the photosensitive drum 8, which is the image plane, is non-linearly varied and not constant. Thus, the velocity of movement is increased at a point whereat the angle of incidence becomes greater. Thus, if a row of spots is placed on the photosensitive drum 8 with the laser beam turned on at predetermined time intervals, the spacings between the spots will be wider toward the opposite ends of the row than at the center. To avoid such a phenomenon, the focusing lens 7 is designed to have the following characteristic:

$$r = f \cdot \theta$$

Such a focusing lens 7 is referred to as the f-$\theta$ lens. Further, when a parallel beam is focused in the form of a spot by the focusing lens, the minimum diameter d min of the spot is given as:

$$d\ min = 2.44\ \lambda f/A$$

where
f: focal length of the focusing lens,
$\lambda$: wavelength of the light used,
A: diameter of the entrance aperture of the focusing lens, and if f and $\lambda$ are constant, increasing A will result in a smaller spot diameter d min. The aforementioned beam expander 4 is employed to provide such an effect. Therefore, where the necessary d min can be provided by the diameter of the beam as it is oscillated from the laser oscillator, the beam expander 4 may be omitted. A beam detector 18, which comprises a small entrance slit and a quickly responsive photoelectric conversion element (such as PIN diode), detects the position of the laser beam 12 as it is swept, and the resulting detection signal determines the timing for starting the input signal to the modulator 3 used to impart desired light information onto the photosensitive drum. This can greatly reduce the errors of the division accuracy of the reflecting surfaces of the polygonal rotatable mirror 5, as well as the mis-synchronism between horizontal signals resulting from the irregularities of rotation of the polygonal mirror, thereby ensuring producton of high-quality images and allowing for greater tolerances of the precisions required of the polygonal rotatable mirror 5 and the drive motor 6, which in turn leads to the possibility of technical simplicity and lower cost of the manufacture.

The laser beam 12 deflected and modulated in the described manner is projected on the photosensitive drum 8, which is then subjected to an electrophotographic treating process to visualize the image on the drum surface, whereafter the visible image is transferred and fixed on a transfer medium 11 which may be plain paper, and finally the transfer medium is put out as a hard copy.

Figure 3:
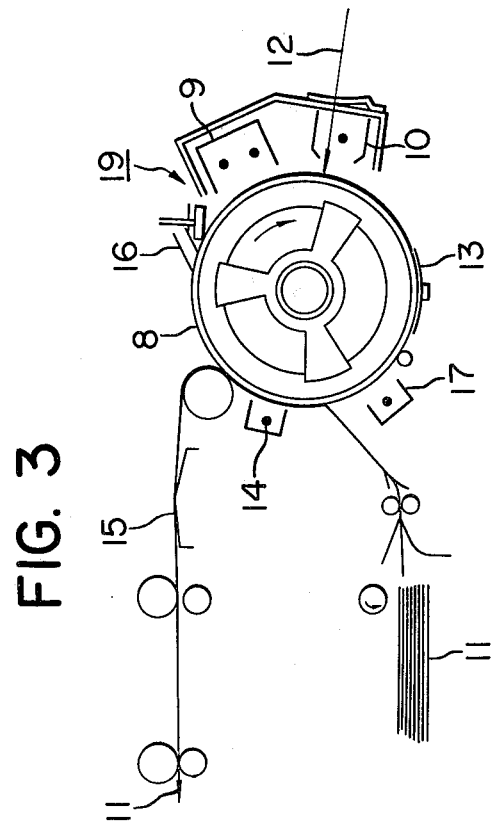
FIG. 3 is a side view showing the recording section of the recording apparatus.

Reference will now be had to FIG. 3 to describe a printing section 17.

An example of the electrophotographic process applicable to the present embodiment is disclosed in our Japanese Patent Publication No. 23910/1967, corresponding to U.S. Pat. No. 3,666,363 wherein the insulative surface of the photosensitive drum 8 basically comprising an electrically conductive back-up member, a photoconductive layer and an insulative layer is uniformly precharged to the positive or the negative polarity by a first corona charger 9 to cause a charge of the opposite polarity to said charging polarity to be captured in the interface between the photoconductive layer and the insulative layer or in the interior of the photoconductive layer, whereafter the laser beam 2 is applied to the surface of the charged insulative layer while, at the same time, AC corona charge is applied from an AC corona discharger 10 to the same surface, to thereby form on the insulating layer surface a pattern resulting from the surface potential difference corresponding to the light-and-dark pattern of the laser beam 12, and then the whole surface of the insulative layer is uniformly exposed to light to form an electrostatic image with high contrast on the insulative layer surface, whereafter the electrostatic image is developed into a visible image by a developing device 13 and by the use of developer composed chiefly of charged toner particles, thence the visible image is transferred to a transfer medium 11 such as paper or the like by utilization of either an internal or external electric field, and then the transferred image is fixed by fixing means using an infrared ray lamp or heated plate, to thereby provide an electrophotographically printed image and on the other hand, after the image transfer, the insulative layer surface is cleaned by a cleaning device 16 for removal of any residual charged particles on the insulative layer surface, thus making the photosensitive drum 8 available for reuse.

In FIG. 3, reference character 14 designates a corona discharger for image transfer, and 17 a post corona discharger. Throughout the drawings, similar reference characters denote similar members.

Figure 4:
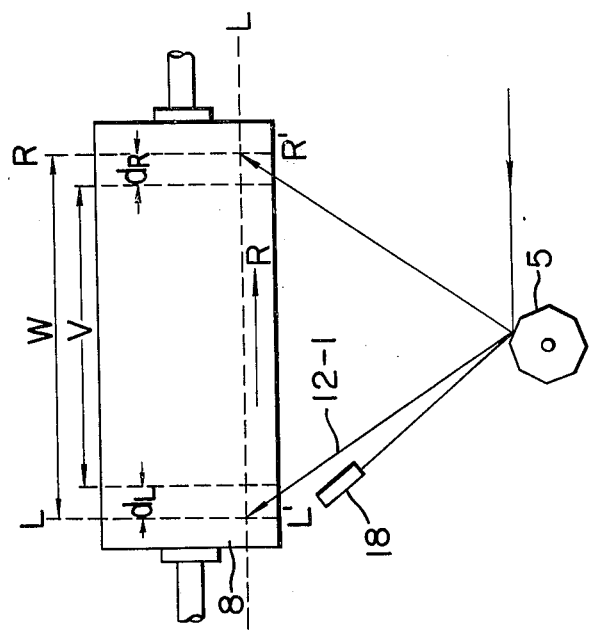
FIG. 4 is a top plan view of a photosensitive drum and its adjacent portions.

In the embodiment described above, a beam detector 18 is employed to detect the beam position, and this beam detector 18 is disposed in a positional relationship with the photosensitive drum 8 (recording paper) as shown in FIG. 4.

More specifically, assuming that the region indicated by the width W on the photosensitive drum 8 is the region to be transferred to a transfer medium (recording paper) and that the beam 12-1 repetitively scans on the straight line, indicated by a dotted line L, in the direction of arrow R, then the beam detector 18 is disposed at a position whereat it can detect a beam positioned farther leftwardly of the beam 12-1 occupying the left extremity of the width W. If the beam detector is fixedly provided in this manner and the deflecting velocity of the beam is made constant, the position of the beam may be exactly known by starting to count clock pulse of a predetermined frequency from the time of detection of the beam.

Thus, recorded information corresponding to any beam position may be read from a recorded information storage means, not shown, so that the beam can be modulated by that information to enable recording of characters or the like. Reading of such recording signals may be accomplished by the use of a technique as shown in the aforementioned U.S. Pat. No. 4,059,833.

In FIG. 4, assuming that the width W is the region to be contacted by transfer medium 11 and the width V is the recording region on which recording is effected (modulation signals are applied to the modulator 3 by recording signals only when the beam scans over this region), then dL and dR represent the left and the right margin space on the recording paper and such marginal regions should not be irradiated with the beam.

Thus, in the regions dL and dR, the beam is controlled so as to be turned off and the beam for writing characters is projected only on the expanse of the width V.

As has been described in detail, the beam detector 8 detects the position of the beam scanning over the recording medium and with the detected position as the reference, it detects recording signals from the recorded information storage means, not shown; however, in an embodiment of the present invention, such a beam detector also detects the intensity of the beam at the same time and in accordance with the detection output, it produces a control signal for providing a predetermined value of beam intensity so that the beam intensity may be controlled in accordance with such control signal at least when the beam is scanning the recording region.

Figure 5:
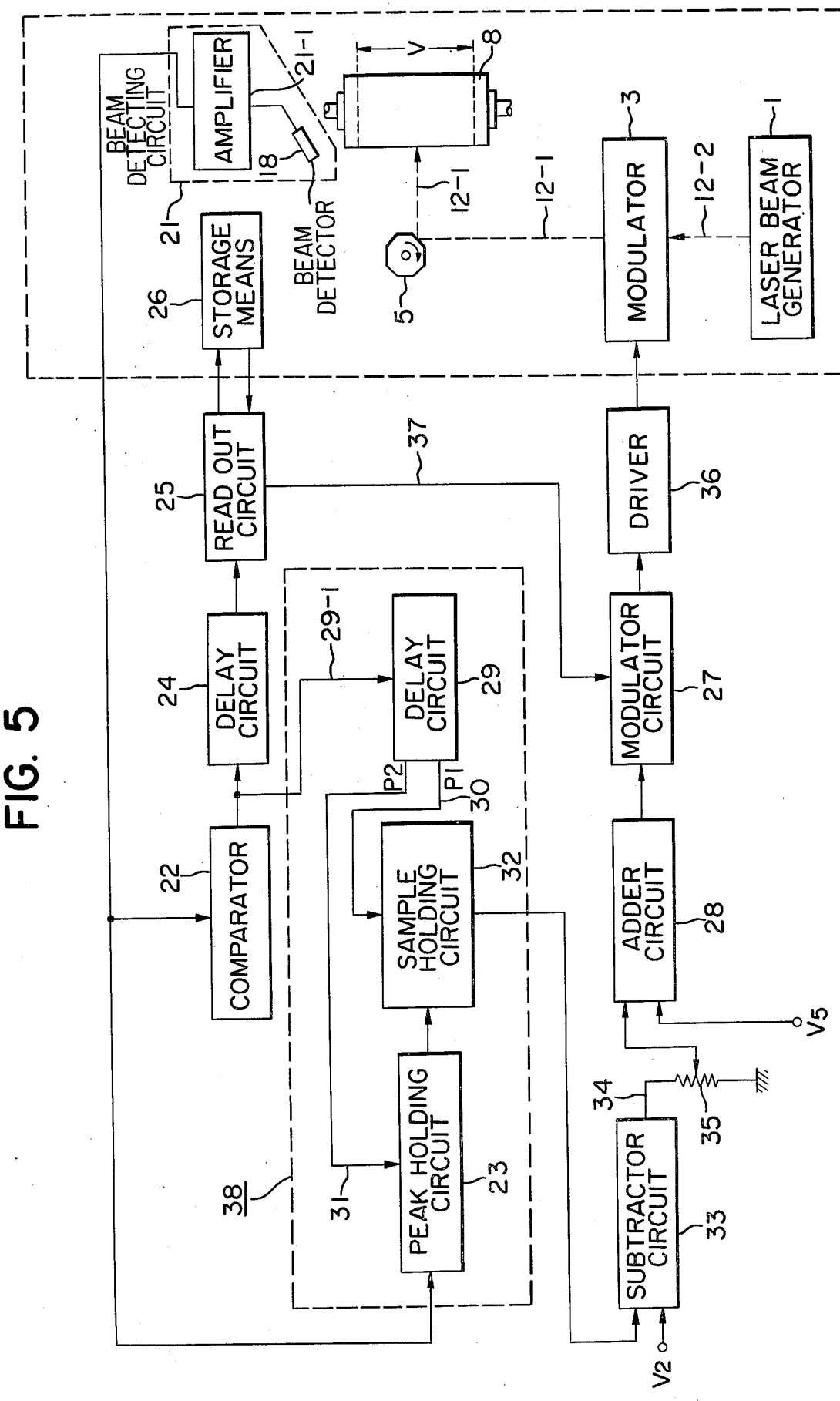
FIG. 5 is a block diagram of the beam recording apparatus to which the present invention is applied.
Figure 6:
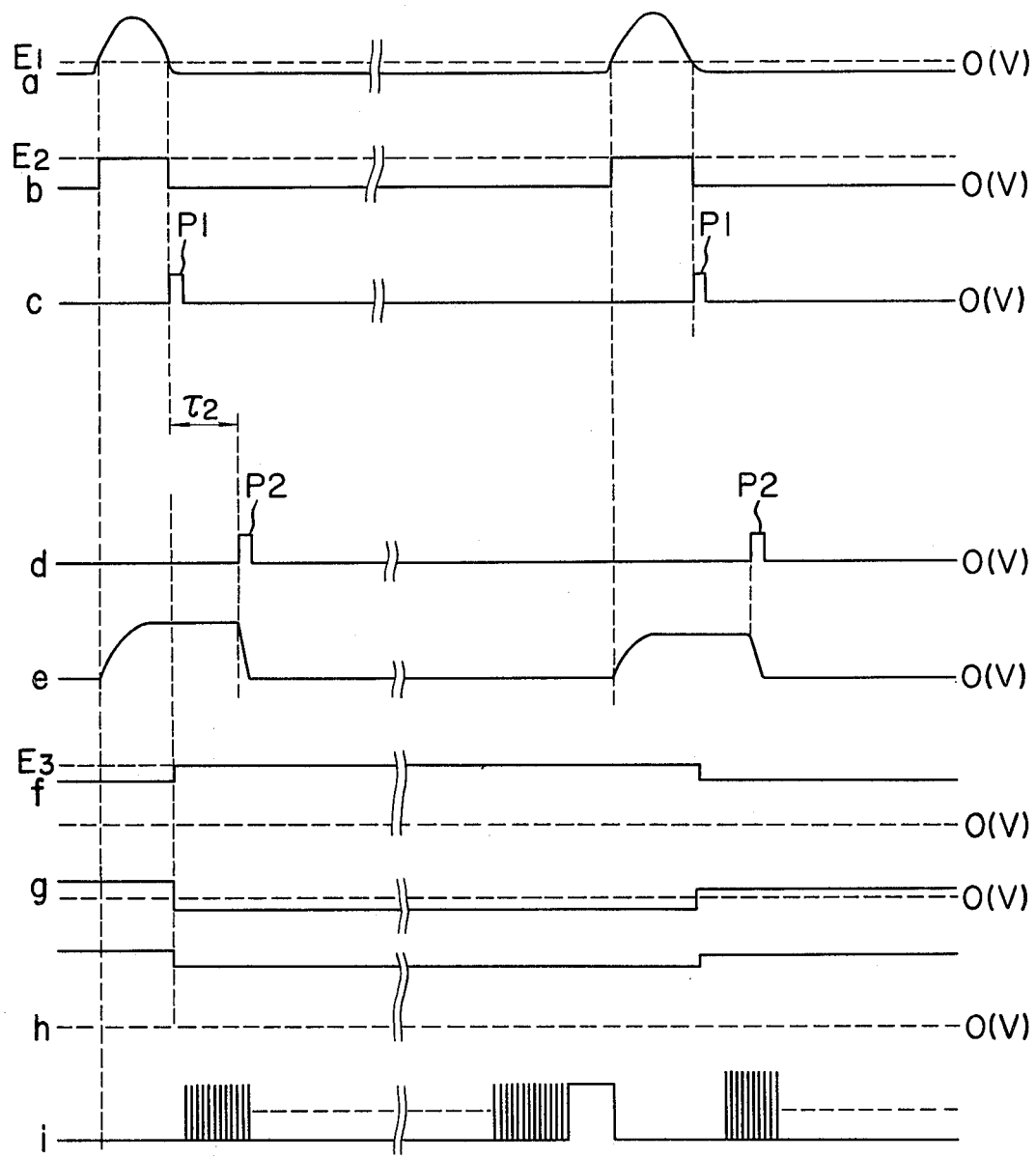
FIG. 6 shows signal waveforms for illustrating the operation of the beam recording apparatus of FIG. 5.

Reference will now be had to FIGS. 5 and 6 to describe the present invention in greater detal. In FIG. 5, reference character 21 designates a beam detecting circuit including therein the beam detector 18 and amplifier 21-1, the detection output of the beam detecting circuit is such as shown in FIG. 6a.

Such detection output is applied to a comparator 22 constituting a waveform shaping means, which compares the detection output with a signal of constant level E1 and produces a signal of level E2 for the detection output being at a higher level than the E1 and produces a signal of zero level for the detection output being at a lower level than the E1. The comparison output of such comparator 22 is applied to a delay circuit 24 to provide a delay of a constant time $\tau$, and the signal so delayed by the delay circuit 24 is applied to a recorded information read-out circuit 25 to instruct this circuit to read out the information stored in a recorded information storage means 26.

The aforementioned time $\tau$ is the time from after the beam 12-1 has passed through the beam detector 18 until the beam reaches the starting end of the recording region V. When the information read-out instructing signal is so applied to the read-out circuit 25, this circuit 25 starts reading out the recorded information from the storage means 26 and applies the read-out information to a brightness modulator circuit 27 through a signal line 37.

The brightness modulator circuit 27 modulates the output signal from an adder circuit 28, to be described, by the aforementioned recorded information, and the resulting modulating signal is applied to a driver circuit 36, the output of which controls the modulator 3 to modulate the beam 12-2, thereby providing the beam 12-1.

On the other hand, the output of the comparator 22 is applied through a signal line 29-1 to the delay circuit 29, which produces on a signal line 30 pulse P1 triggered in accordance with the falling of the output of the comparator 22, as shown in FIG. 6c and produces on a signal line 31 pulse P2 delayed by time $\tau 2$ with respect to pulse P1, as shown in FIG. 6d. The output of the beam detecting circuit 21 is applied to a peak holding circuit 23 which holds the peak value of the aforementioned beam detection signal as shown in FIG. 6e. Being applied to such peak holding circuit 23 is the pulse P2 as the clear signal for clearing the peak value held, so that the initial level is restored upon application of the pulse P2 thereto, as shown in FIG. 6e. The output signal from the peak holding circuit 23 as shown in FIG. 6e is further applied to a sample holding circuit 32 to which is already applied the pulse P1 as sample signal, so that the output thereof is renewed to be the hold voltage of the peak holding circuit 23 upon each arrival of the pulse P1, as shown in FIG. 6f.

Figure 8:
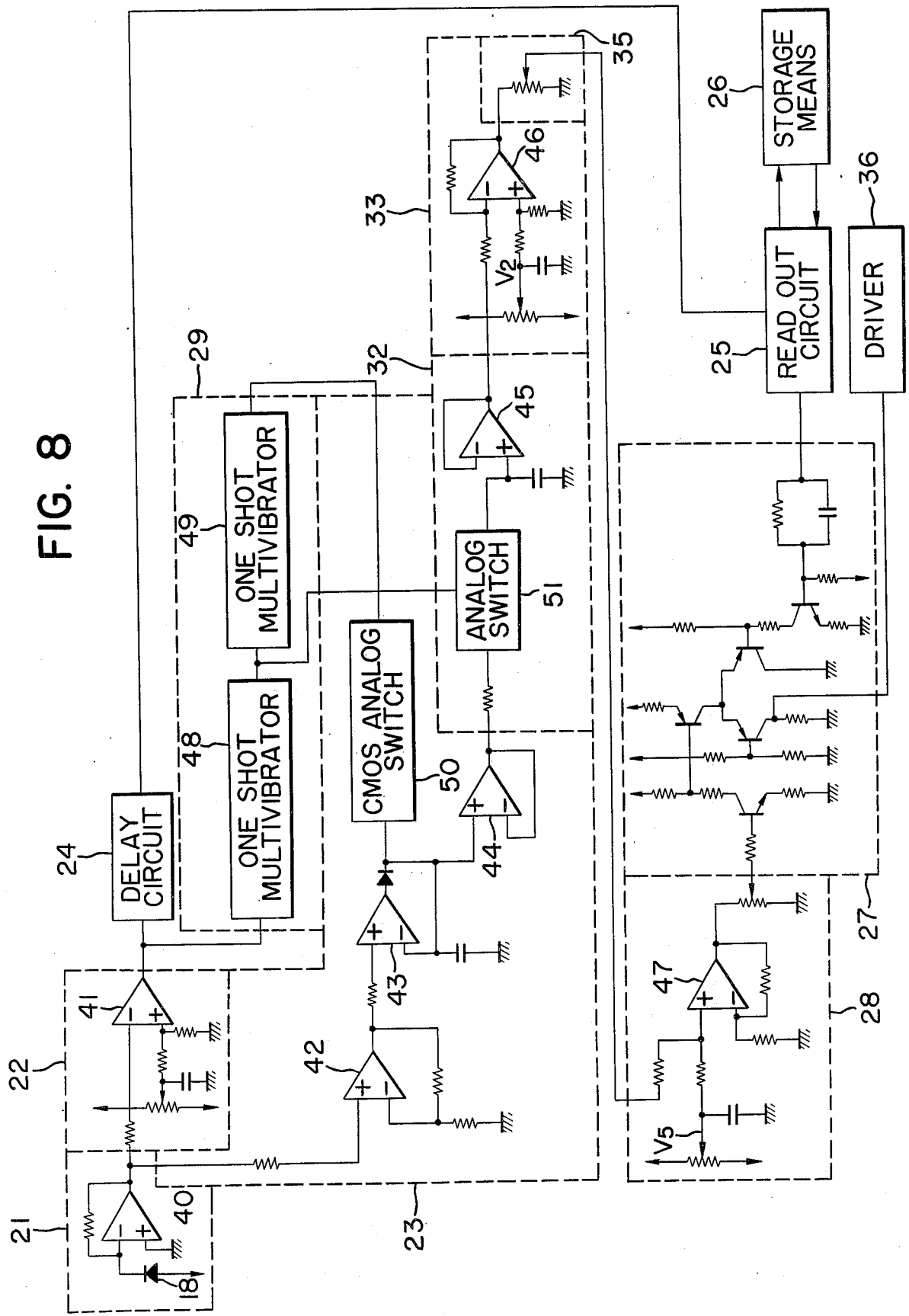
FIG. 8 is a detailed circuit diagram of the beam recording apparatus shown in FIG. 5.

The output of such sample holding circuit 32 is applied to a subtractor circuit 33 (which actually is constituted by an operational amplifier as shown in FIG. 8) to which voltage V2 has been applied as reference voltage. The subtractor circuit 33 is intended to produce zero output on the output line 34 thereof when the beam detecting circuit 21 detects a predetermined quantity of light Wo of the beam and to produce an output signal corresponding to the difference W from said quantity of light Wo when the beam detecting circuit 21 detects a quantity of light W which is greater or less than Wo.

The operation of the subtractor circuit is usually expressed as:

$$V3 = K(V2 - V1)$$

where
K: amplification factor,
V1, V2: input voltages,
V3: output voltage.

Assuming here that V2 is the reference voltage and $V1 = VH$ (VH is the output of the sample holding circuit) and if V2 equals the output voltage of the sample holding circuit for the quantity of light Wo which is to be made constant, then V3 will be the value obtained when only the fluctuation of the quantity of light W, of the beam which has scanned the beam detector 18, with respect to the quantity of light Wo, is detected as the variation in voltage. The output waveform of such subtractor circuit 33 is shown in FIG. 6g.

Next, the subtraction output on the output line 34 is applied to a variable resistor 35 and its gain adjustment is effected so that the fluctuating component of the quantity of light W with respect to the set quantity of light Wo becomes minimum, whereafter it is applied to the adder circuit 28 (which actually is constituted by an operational amplifier as shown in FIG. 8).

Operation of the adder circuit is usually expressed as:

$$V6 = K1(V4 + V5)$$

where
K1: amplification factor,
V4, V5: input voltages,
V6: output voltage.

Assuming here that $V4 = V3/K2$, V4 will be the feedback voltage transmitted from the subtractor circuit 28. Note that K2 is the loss by the variable resistor 35 and V3 is the output voltage of the subtractor circuit 33.

If V5 as a kind of bias voltage is made equal to the input voltage to be applied to the brightness modulator circuit 27 in order to render the intensity of the beam equal to the set quantity of light Wo, then the output voltage V6 resulting from the addition of V4 and V5 in the adder circuit 28 provides the feedback information signal for negating the fluctuation of the quantity of light by the beam scanning over the recording medium. The output waveform of such adder circuit is shown in FIG. 6h. That is, when the quantity of light W detected by the beam detecting circuit 21 is increased above the set quantity of light Wo, the output voltage V6 of the adder circuit becomes less than V4, thereby acting in the direction to decrease the quantity of light W, and when the quantity of light W is decreased below the Wo, V6 becomes greater than V4, thereby acting in the direction to increase the quantity of light W.

Subsequently, the output of the adder circuit 28 is transmitted to the brightness modulator circuit 27. The brightness modulator circuit 27 is a circuit for producing a modulation signal from information signal (logic "0" or "1" signal) consisting of dots read out from the storage means 26 for image information or the like, as already noted. More specifically, when information signal of logic "1" is read out from the storage means 26, the modulator circuit 27 derives the adder circuit output voltage V6, and when information signal of logic "0" is read out, the modulator circuit 27 derives a voltage 0. In other words, the brightness modulator circuit effects modulation of brightness by turning on a peak lamp in response to the output from the adder circuit 28. The information signal subjected to the brightness modulation as shown in FIG. 6i is transmitted to the driver circuit 36 of the light modulator 3. The light modulator in turn is controlled by the information signal as shown in FIG. 6i, thereby ensuring that the quantity of light of the beam scanning over the recording medium is constant.

By the above-described circuit arrangement, there is provided a control system whereby the quantity of light of the beam scanning over the recording medium is detected during each scan and the resulting detection signal acts to ensure that the quantity of light of the scanning beam is constant.

In FIG. 5, similar reference characters to those in the other Figures are similar in significance to the latter.

Figure 7:
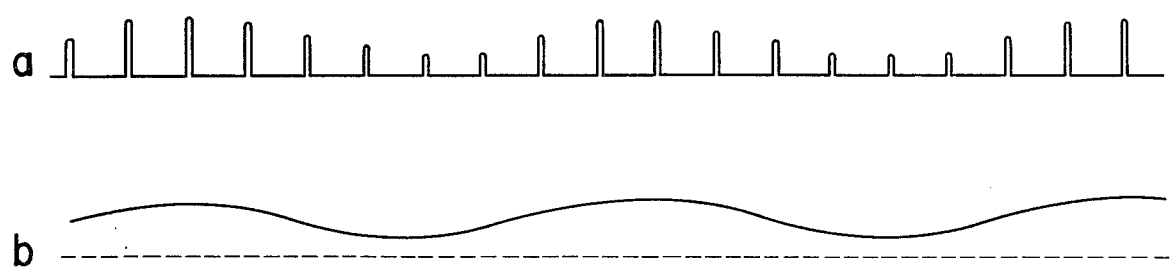
FIG. 7 shows signal waveforms for illustrating the operation of the beam recording apparatus according to another embodiment of the present invention.

As a further embodiment of the present invention, there may be presented one in which the circuit portion 38 encircled by dotted line in FIG. 5 is replaced by a low-pass filter circuit, although the signal line 29-1 is eliminated. Thus, when a beam detection signal as shown in FIG. 7a is applied to such low-pass filter circuit, the output of the filter circuit may produce an output signal filtered as shown in FIG. 7b.

Therefore, by such output signal from the low-pass filter circuit being applied to the subtractor circuit 33, variable resistor 35, adder circuit 28, brightness modulator circuit 27 and driver circuit 36 in a manner similar to that described in connection with the embodiment of FIG. 5, the quantity of light of the beam scanning over the recording medium can be made constant, as already noted.

Referring to FIG. 8 which shows the actual circuit of the beam recording apparatus shown in FIG. 5, the portions encircled by dotted line and given similar reference numerals to those in FIG. 5 correspond to the circuit portions of FIG. 5.

Designated by 40–47 are operational amplifiers, 48 and 49 one shot multivibrators, 500 a CMOS analog switch and 51 an analog switch.

Figure 9:
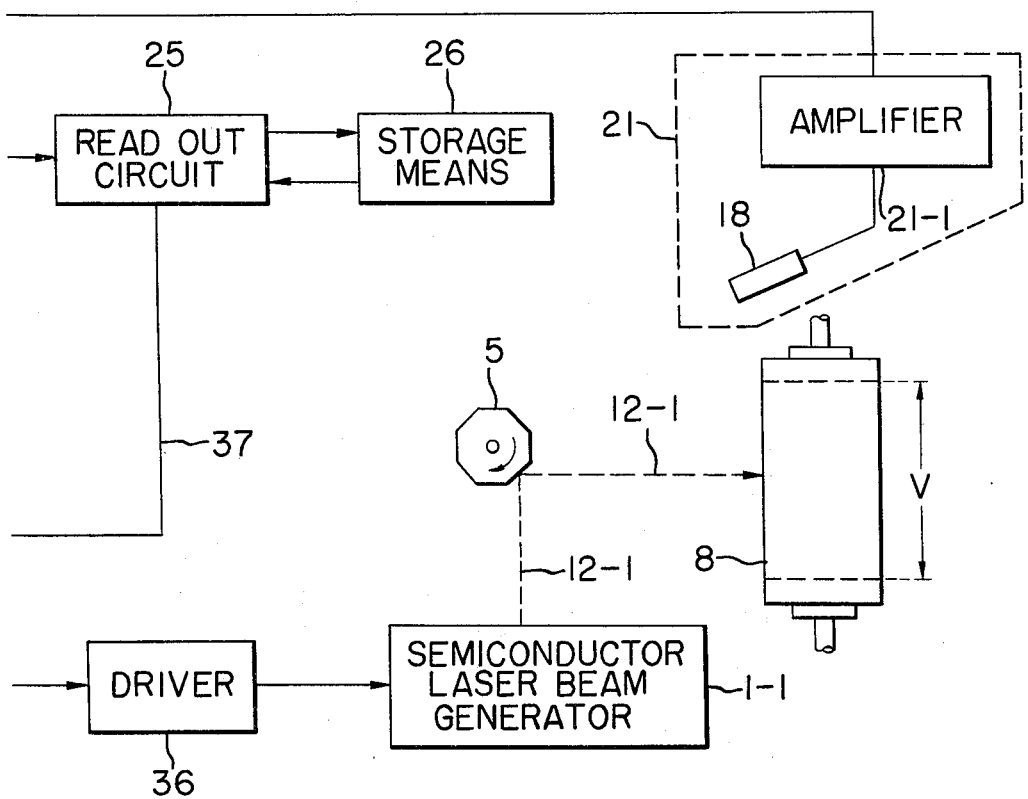
FIG.9 is a block diagram showing essential portions of the beam recording apparatus according to a further embodiment of the present invention.

FIG. 9 shows still a further embodiment of the present invention in which a semiconductor laser beam generator 1-1 is directly driven by the output of the driver 36. As is well-known, the semiconductor laser beam generator 1-1 is such that its generation of laser beam is controllable by ON-OFF of driving current and so, it can eliminate the modulator 3 which is shown in FIG. 5. Unshown portions of FIG. 9 are of the same construction as FIG. 5, and similar reference characters to those in FIG. 5 are similar in significance to the latter.

Figure 10:
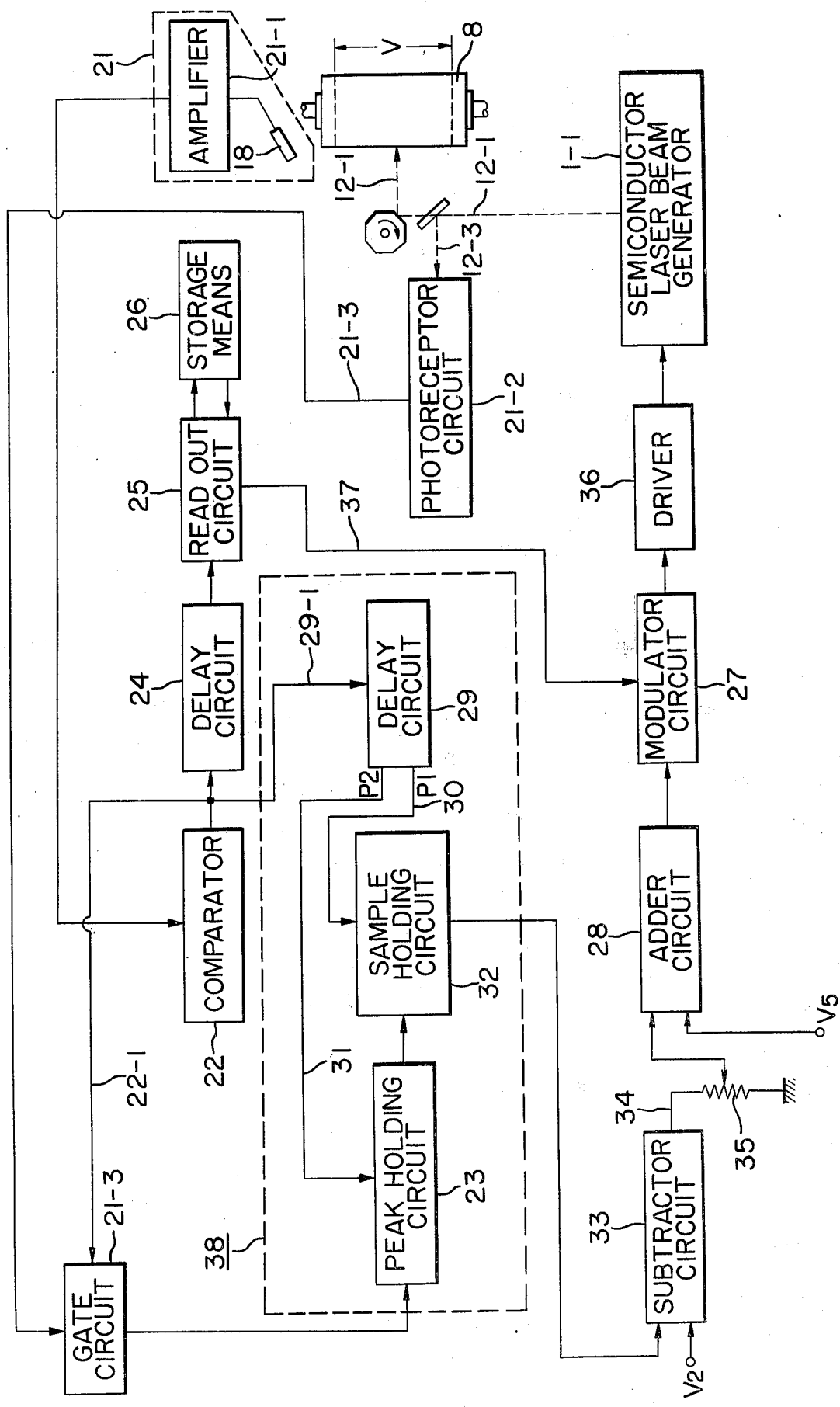
FIG. 10 shows the beam recording apparatus according to still a further embodiment of the present invention.

In a further embodiment of the present invention shown in FIG. 10, the laser beam 12-1 generated from the semiconductor laser beam generator 1-1 is split by a beam splitter 5-1 and a laser beam 12-3 obtained by the splitting is received by a photoreceptor circuit 21-2 including a photoreceptor element and an amplifier circuit. Thus, a level signal having a voltage level corresponding to the intensity of the laser beam 12-3 may be obtained on the output line of the photoreceptor circuit 21-2.

Such level signal is applied to a gate circuit 21-3, to which is further applied a gate signal through a signal line 22-1, whereby the level signal is applied through the gate circuit 21-3 to the peak holding circuit 23.

With such a construction, the intensity of the laser beam 12-1 can be maintained constant in the same manner as shown in FIG. 5.

Similar reference characters to those in FIG. 5 are similar in significance to the latter.

In any of the foregoing embodiments, a polygonal mirror is used to deflect the laser beam, whereas it is of course possible to employ a galvano-mirror or the like.

Further, each of the foregoing embodiments has been described with respect only to a case where all or part of the laser beam emitted to illuminate the photosensitive drum is detected by the beam detector, but where use is made of a semiconductor laser beam generator or the like which emits a main and an auxiliary beam in different directions, the beam intensity may of course be detected from the auxiliary beam.

Furthermore, in any of the illustrated embodiments, control of the beam intensity has been shown to be effected each time the recording beam scans over the photosensitive drum (in other words, once per single scan), whereas the present invention is not restricted to such embodiments but it is possible to arrange such that once the beam intensity is controlled to a certain level, the beam intensity so controlled is maintained during a period comprising a plurality of scans.

What we claim is:

1. An information formation apparatus for forming information on a beam-irradiated member by the use of a beam, comprising:
   beam formation means for forming a beam modulated by information signals applied thereto;
   deflector means for deflecting said beam in accordance with a scan pass;
   an information formation member on which the beam deflected by said deflector means is projected, said information formation member having an information formation region on which information is formed by said beam;
   means for detecting the intensity of said beam at a predetermined time other than the time when said beam scans said information formation region, and producing a detection signal in accordance with the intensity of said beam;
   peak holding means for detecting and holding the maximum level in said detection signal; and
   comparison means for comparing said maximum level with a reference level and producing a control signal in accordance with a difference therebetween.

2. An information formation apparatus according to claim 1, wherein said beam formation means comprises a semi-conductor laser generator.

3. An information formation apparatus according to claim 1, wherein said beam formation means comprises a laser beam generator for generating a laser beam and a modulator for receiving and modulating the laser beam generated by said laser beam generator and for emitting the modulated laser beam.

4. An information formation apparatus according to claim 1, wherein said deflector means comprises a beam reflector having a plurality of mirrored surfaces and drive means for rotatively driving said beam reflector.

5. An information formation apparatus according to claim 1, wherein said deflector means comprises a galvano-mirror.

6. An information formation apparatus according to claim 1, wherein said beam detector means produces said detection signal each time said beam scans said information formation member.

7. An information formation apparatus for forming information on a beam-irradiated member by the use of a beam, comprising:
beam formation means for forming a beam modulated by information signals applied thereto;
deflector means for deflecting said beam in accordance with a scan pass;
an information formation member on which the beam deflected by said deflector means is projected, said information formation member having an information formation region on which information is formed by said beam;
beam detector means for detecting the intensity of said beam scanning the other portion of said information formation member than said information formation region and producing a detection signal corresponding to the beam intensity detected; and
beam control means for generating, from a detection signal generated by said beam detector means, a beam intensity control signal for controlling the intensity of a beam generated by said beam formation means, and control the intensity of the beam generated by said beam formation means at least while said beam is scanning the information formation region of said information formation member, said control means comprising holding means adapted to hold the intensity of said beam as long as said beam scans said information formation region, thereby forming a comparison signal, first comparator means for detecting a difference between said comparison signal formed by said holding means and a reference signal and for forming a first control signal corresponding to said difference, and first control means for controlling the intensity of said beam in accordance with said first control signal.

8. An information formation apparatus for forming information on a beam-irradiated member by the use of a beam, comprising:
beam formation means for forming a beam modulated by information signals applied thereto;
deflector means for deflecting said beam in accordance with a scan pass;
an information formation member on which the beam deflected by said deflector means is projected, said information formation member having an information formation region on which information is formed by said beam;
beam detector means for detecting the intensity of said beam scanning the other portion of said information formation member than said information formation region and producing a detection signal corresponding to the beam intensity detected; and
beam control means for generating, from a detection signal generated by said beam detector means, a beam intensity control signal for controlling the intensity of the beam generated by said beam formation means, and control the intensity of the beam generated by said beam formation means at least while said beam is scanning the information formation region of said information formation member, said control means comprising low-pass filter means to which said detection signal produced by said beam detector means is applied to form a filter signal, second comparator means for detecting a level difference between said filter signal formed by said low-pass filter means and a reference signal and for forming a second control signal corresponding to said difference, and second control means for controlling the intensity of said beam in accordance with said second control signal.

9. An information formation apparatus for forming information on a beam-irradiated member by the use of a beam, comprising:
beam formation means for forming a beam modulated by information signals applied thereto;
deflector means for deflecting said beam in accordance with a scan pass;
an information formation member on which the beam deflected by said deflector means is projected, said information formation member having an information formation region on which information is formed by said beam;
beam detector means for detecting the arrival at a predetermined position of the beam deflected by said deflector means and for detecting the beam intensity of said beam to produce a detection signal corresponding to the detected beam intensity;
modulation starting means for starting the formation of a beam modulated by information signal in a predetermined time after the detection signal has been produced by said beam detector means; and
beam control means for generating, from a detection signal generated by said beam detector means, a beam intensity control signal for controlling the intensity of the beam generated by said beam formation means, and control the intensity of the beam generated by said beam formation means at least while said beam is scanning the information formation region of said information formation member.

10. An information formation apparatus according to claim 9, wherein said information formation member comprises a cylindrical photosensitive member.

11. An information formation apparatus according to claim 9, wherein said beam detector means is disposed adjacent to said recording member.

12. An information formation apparatus according to claim 9, wherein said beam formation means comprises a semi-conductor laser beam generator.

13. An information formation apparatus according to claim 9, wherein said beam detector is disposed upstream of said information formation member with respect to the scanning direction of said beam.

14. An information formation apparatus for forming information on a beam-irradiated member by the use of a beam, comprising:
beam formation means for forming a beam modulated by information signals applied thereto;
deflector means for deflecting said beam in accordance with a scan pass;
an information formation member on which the beam deflected by said deflector means is projected, said information formation member having an information formation region on which information is formed by said beam;

first beam detector means for detecting the arrival at a predetermined position of the beam deflected by said deflector means and for producing a first detection signal;

modulation starting means for starting the formation of the beam modulated by information signal in a predetermined time after said first detection signal has been produced by said first beam detector means;

second beam detector means for receiving the beam which is emitted from said beam formation means but not deflected by said deflecting means, and forming a second detection signal corresponding to the intensity of the beam received;

beam control means for controlling the intensity of said beam in accordance with said second detection signal from said second beam detector means at least as long as said beam scans said information region of said information formation member; and sampling means for sampling said second detection signal in accordance with said first detection signal and for applying said sampled second detection signal to said beam control means.

15. An information formation apparatus according to claim 14, further comprising:

beam splitter means for splitting the beam from said beam formation means into a plurality of beams and for directing one of the split beams to said deflector means and another of the split beams to said second beam detector means.

16. An information formation apparatus according to claim 14, wherein said beam formation means comprises a semi-conductor laser beam generator.

17. An information formation apparatus according to claim 14, wherein said beam control means comprises:

level holding means for holding the level of said second detection signal produced by said second beam detector means;

a comparator for comparing the level held by said level holding means with a reference level and producing a difference signal corresponding to a difference between said two levels; and control means for controlling the intensity of said beam in accordance with said difference signal.

18. An information formation apparatus for forming information on a beam-irradiated member by the use of a beam, comprising:

beam formation means for forming a beam modulated by information signals applied thereto;

deflector means for deflecting said beam by rotating a beam reflector;

an information formation member on which the beam deflected by said deflector means is projected, said information formation member having an information formation region on which information is formed by said beam;

beam detector means for receiving the beam deflected by said deflector means and positioned outside said information region of said information formation member and for producing a detection signal corresponding to the intensity of the received beam;

beam control means for generating, from a detection signal generated by said beam detector means, a beam intensity control signal for controlling the intensity of the beam generated by said beam formation means, and control the intensity of the beam generated by said beam formation means at least while said beam is scanning the information formation region of said information formation member;

delay means for delaying the detection signal produced by said detecting means;

storage means for storing a recording signal therein; and read-out means for starting to read out the recording signal stored in said storage means in accordance with the signal delayed by said delay means, and applying the recording signal to said beam forming means.

* * * * *